United States Patent [19]

Sabiron

[11] Patent Number: 4,914,963
[45] Date of Patent: Apr. 10, 1990

[54] DOUBLE TUNING FORK TYPE LAMINATED FORCE TRANSDUCER, MANUFACTURING METHOD THEREFOR AND APPLICATION THEREOF IN A LOAD CELL

[75] Inventor: Gérard F. Sabiron, Saint Maur, France

[73] Assignee: Esselte Moreau S.A., Saint Maur, France

[21] Appl. No.: 263,073

[22] Filed: Oct. 27, 1988

[30] Foreign Application Priority Data

Nov. 5, 1987 [FR] France ................. 87 15352

[51] Int. Cl.⁴ .............................................. G01L 1/10
[52] U.S. Cl. ..................... 73/862.59; 310/338; 29/25.35
[58] Field of Search ............ 73/651, 862.59, 862.41, 73/517 AV, 778; 310/321, 323, 338; 29/25.35, 592.1

[56] References Cited

U.S. PATENT DOCUMENTS

| | | | |
|---|---|---|---|
| 3,465,597 | 9/1969 | Riordan | 73/517 AV |
| 3,486,383 | 12/1969 | Riordan | 73/517 AV |
| 4,299,122 | 10/1981 | Ueda et al. | 73/862.59 |
| 4,544,858 | 10/1985 | Nishiguchi et al. | 310/338 |
| 4,751,849 | 6/1988 | Paros et al. | 73/862.59 |

FOREIGN PATENT DOCUMENTS

| | | |
|---|---|---|
| 3423501 | 1/1985 | Fed. Rep. of Germany . |
| 1333981 | 6/1963 | France . |
| 58-21532 | 2/1983 | Japan ............... 73/862.59 |
| 61-210923 | 9/1986 | Japan ............... 73/862.59 |
| 62-3630 | 1/1987 | Japan ............... 73/862.59 |

OTHER PUBLICATIONS

Japanese Patent Abstracts of Japan, vol. 11, No. 173, (P-582) 2620, Jun. 4, 1987.

Primary Examiner—Hezron E. Williams
Assistant Examiner—Louis M. Arana
Attorney, Agent, or Firm—Browdy and Neimark

[57] ABSTRACT

A double tuning fork type force transducer comprising two identical parallel branches fastened at their ends to two coupling members adapted to vibrate in bending mode and in phase opposition in response to imposed vibrational loads with an intrinsic frequency representative of the amplitude of a force F applied longitudinally to the coupling members is laminated; it comprises two identical metal leaf springs of constant thickness forming said branches and comprising ends of larger width than said branches and held apart by two metal spacers both having the same thickness, these spacers and these ends being fastened within said coupling members and having substantially the same external profile.

19 Claims, 4 Drawing Sheets

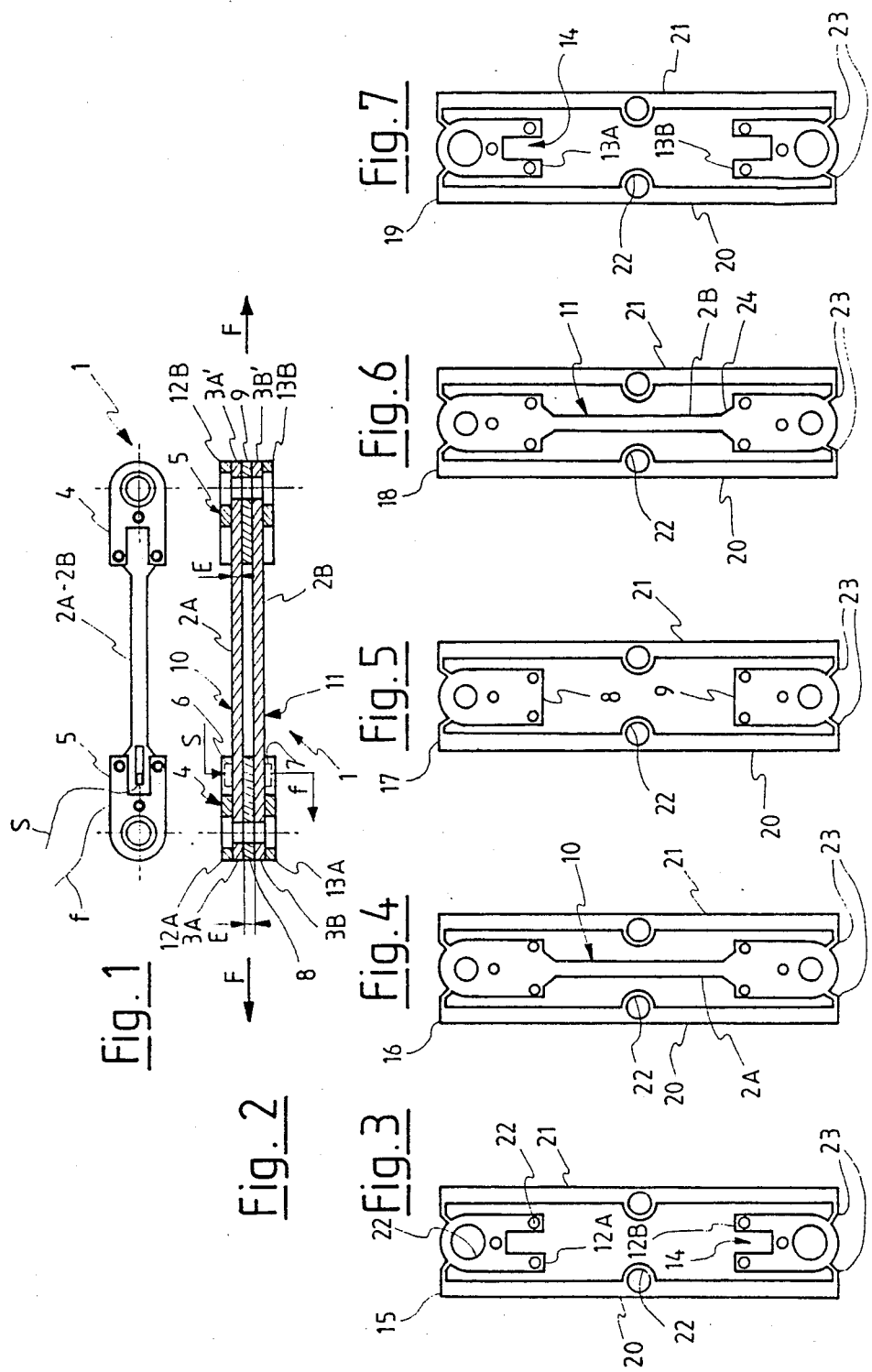

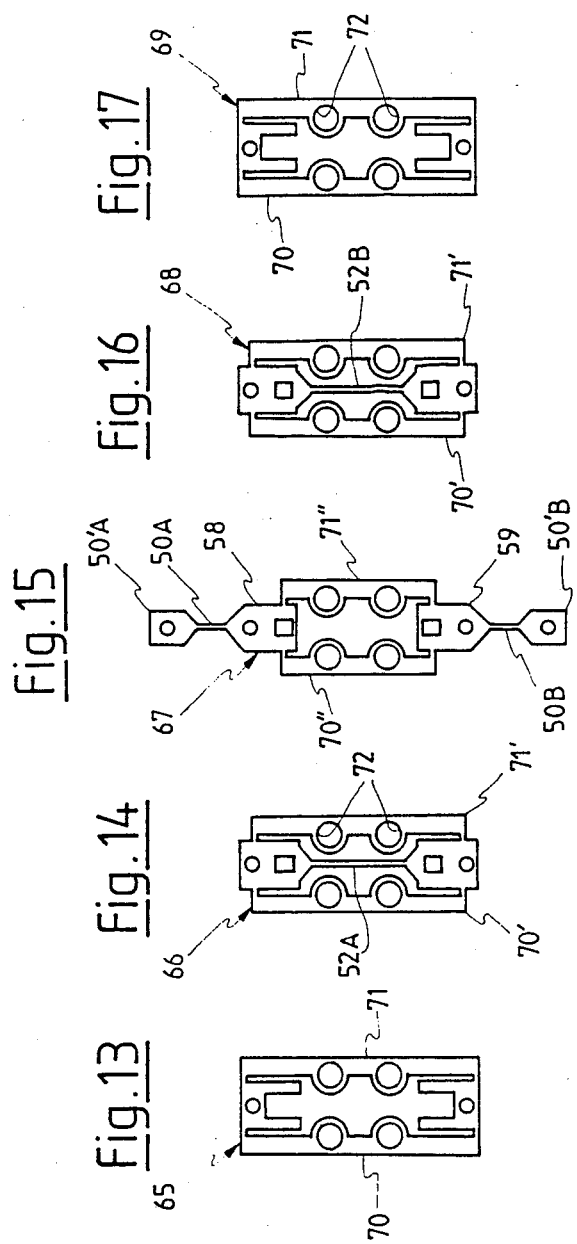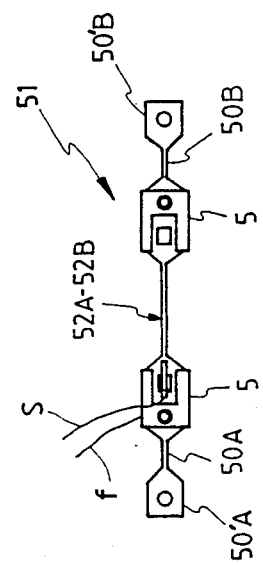

DOUBLE TUNING FORK TYPE LAMINATED FORCE TRANSDUCER, MANUFACTURING METHOD THEREFOR AND APPLICATION THEREOF IN A LOAD CELL

BACKGROUND OF THE INVENTION

1. Field of the Invention

The invention concerns a force transducer in the form of a double tuning fork adapted to vibrate at an intrinsic frequency which is representative of the amplitude of a longitudinal force applied to it, a manufacturing process for a transducer of this kind and an application of this transducer within a load cell, for use in a weighing instrument, for example.

2. The Prior Art

Double tuning fork force transducers are already known, in particular from the documents U.S. Pat. No. 4,299,122 (Y.E.W.) and DE No. 3.423.501 (SHINKO DENSHI). A notable benefit of these transducers is that, because the branches of the double tuning fork vibrate in phase opposition, vibrational energy losses are limited. These transducers are equipped with an excitation device and a frequency sensor. They may be fitted into load cells but also, and particularly, into pressure sensors.

Although the document U.S. Pat. No. 4,299,122 mentions the possibility of manufacturing a transducer of this kind in several parts, this document and the previously mentioned German document describe transducers of unitary construction.

In practice, currently known transducers are cut out from the solid by wire electro-erosion, which is slow and costly. For example, electro-erosion of "ELINVAR" blocks proceeds at the rate of approximately 2 mm/min. Also, the system controlling the path of the cutting wire is generally complex and costly.

As the intrinsic frequencies of these transducers are likely to vary not only with the applied force but also with the length of their branches, the materials used are generally chosen to have negligible coefficients of expansion.

SUMMARY OF THE INVENTION

An object of the invention is to make the manufacture of such transducers faster and more economical.

The invention therefore proposes a double tuning fork type force transducer comprising two identical parallel branches fastened at their ends to two coupling members adapted to vibrate in bending mode and in phase opposition in response to imposed vibrational loads with an intrinsic frequency representative of the amplitude of a force F applied longitudinally to the coupling members, characterized in that it is laminated, comprising two identical metal leaf springs of constant thickness forming said branches and comprising ends of larger width than said branches and held apart by two metal spacers both having the same thickness, these spacers and these ends being fastened within said coupling members and having substantially the same external profile.

According to preferred arrangements that may be combined with each other:

the ends of the leaf springs are bordered externally by metal stiffener and anchor plates which are fastened to them and have substantially the same external profile;

the leaf springs and the spacers have the same thickness E;

the stiffener plates, the leaf springs and the spacers have the same thickness;

the transducer is formed from sheets made from the same elastic material;

the transducer is formed from adhesively bonded, or even riveted or riveted adhesively bonded sheets;

the elastic branches are of constant width;

the elastic branches are each formed by two symmetrical halves of non-constant width which merge through a central area of minimum width and are joined to the coupling members by two areas of the same minimum width;

the halves have a maximum width (L) which is between three and five times the minimum width (l);

the halves of the elastic branches have sawtooth-shaped flanks.

In one advantageous embodiment of the invention the spacers are extended in opposed relationship to the branches by torsion arms which terminate in fixing terminal areas. These arms preferably have a length of at least 50% of the length of the branches of the transducer, possibly reaching or exceeding 200% of this length. These arms make it possible to compensate for any torsion between the areas to which said fixing terminal areas are attached. By minimising damping, these arms also make it possible to increase the quality factor Q of the transducer (the ratio of the resonant frequency to the width of the resonance peak at 70% of the resonance amplitude).

In practice the length of these arms is preferably at most equal to that of the branches of the tuning fork.

The invention also proposes a method of manufacturing a double tuning fork type force transducer comprising two parallel identical elastic branches joined at their ends by coupling members, characterized in that two identical metal leaf springs of constant thickness comprising said branches and ends of larger width are cut out as are a pair of spacers of the same constant thickness and of substantially same external profile as said ends and these spacers are placed between and attached to the ends of these leaf springs so as to obtain a laminated transducer.

According to preferred arrangements, which may be combined with each other:

a method is provided in which pairs of metal plates having substantially the same external profile as the spacers are also cut out and attached to the spacers and to the ends of the leaf springs.

the leaf springs, the pair of spacers and the pairs of plates are cut out in such a way as to be joined by fragile links to longitudinal positioning strips which are all identical, these longitudinal strips are superposed and, after fastening the leaf springs, the spacers and the plates together, the fragile links are cut.

By way of an application, the invention also proposes a load cell comprising a block incorporating first and second vertical uprights respectively intended to be fixed to a base and to a weighing platform, joined by four flexible areas with two horizontal beams through the middle of which pass two aligned vertical bores, and two respectively upper and lower arms mounted cantilever fashion on the first and second vertical uprights, the force transducer being inserted vertically through the bores in the horizontal beams and joined to the ends of the cantilever arms. This transducer is advantageously of the type with torsion compensating arms (see above.

According to a preferred arrangement, the transducer is articulated to the ends of the cantilever arms about axes perpendicular to the vertical uprights and, to the horizontal beams.

BRIEF DESCRIPTION OF THE DRAWINGS

Objects, characteristics and advantages of the invention emerge from the following description given by way of non-limiting example with reference to the appended drawings, in which:

FIG. 1 is a front view of a force transducer in accordance with the invention;

FIG. 2 is a view of the force transducer in longitudinal cross-section;

FIGS. 3 through 7 are front views of five flat members which, after superposition, are used in the manufacture of the force transducer from FIG. 1;

FIGS. 13 through 17 are front views of five flat members which, after superposition, are used in the manufacture of another transducer in accordance with the invention; and FIG. 18 is a front view of this other transducer.

DETAILED DESCRIPTION OF THE EMBODIMENT

Figure 8:
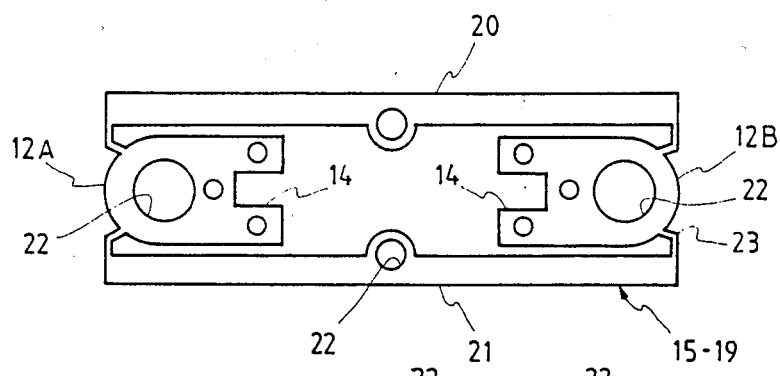
FIG. 8 is an enlarged view of FIGS. 3 and 7.

FIGS. 1 and 2 show a double tuning fork type force transducer 1 comprising two parallel and identical elastic branches 2A and 2B fastened at their ends to two coupling members 4 and 5 which hold them apart with a constant distance between them.

FIG. 2 shows in chain-dotted outline an excitation device 6 receiving an excitation signal S to make the branches 2A and 2B vibrate and a frequency sensor 7 designed to respond to the intrinsic frequency f of vibration of these branches. This frequency is representative of the amplitude of a longitudinal force, for example a traction force applied between the coupling members 4 and 5 (see the arrows F).

In accordance with the invention the transducer 1 is laminated parallel to its length.

As seen in FIG. 2, the transducer comprises two leaf springs of constant thickness forming the branches 2A and 2B with ends 3A, 3A', 3B, 3B' which are held a constant distance apart by spacers 8 and 9 which are both the same thickness.

The leaf springs and the spacers preferably have the same thickness E.

The ends of the leaf springs, which here are substantially wider than the branches, are preferably bordered externally by stiffener and anchor plates 12A, 12B, 13A, 13B which are preferably of a thickness E equal or larger than that of leaf springs 10 and 11 and of the spacers 8 and 9.

The spacers 8 and 9, the ends 3A, 3B, 3'A and 3'B of the leaf springs and the plates 12A, 12B, 13A, 13B advantageously have the same external profile. Notches 14 are preferably formed in the plates near the junction of the branches 2A and 2B at their ends, in particular to enable fixing by adhesive bonding of the excitation device and of the sensor 7, each in the plane of one of the branches 2A or 2B.

The force transducer is symmetrical relative to a longitudinal plane passing through the branches 2A, 2B, to the section plane of FIG. 2 and to a central transverse plane.

A laminated transducer of this kind is manufactured by using any appropriate known process such as stamping, microstamping, laser cutting, micro-etching, etc., to cut out metal plates which are advantageously all of the same kind. The components cut out in this way are then superposed and attached to each other by adhesive bonding and/or rivetting and/or spot welding so as to constitute the rigid coupling members.

The spacers 8 and 9, the plates 12A and 12B and the plates 13A and 13B are advantageously cut out in pars.

FIGS. 3 through 7 show cut out components 15, 16, 17, 18 and 19 which, after they are superposed and attached together, are used to construct the transducer of FIG. 1.

These cut out components 15 through 19 have the special feature of each comprising, on each side of the plates, leaf springs or spacers, longitudinal strips 20 and 21 which have the same width and the same length and therefore identical if they have the same thickness, which link the plates or spacers to each other, stiffening the pairs of plates or spacers and the leaf springs and reducing the risk of warping during handling; they also provide for extremely accurate positioning of the components relative to each other during their superposition and attachment to each other.

Rivetting holes 2 are in this instance provided on each component, using the same relative disposition, and i the longitudinal strips as well as in the spacers, the plates and the ends of the leaf springs. As an alternative or in addition to this, these parts may be adhesively bonded, for example using a conductive epoxy adhesive of the "EPOTEK" type.

Fragile links 23 of small cross-section are provided for linking the longitudinal strips to the plates, the spacers and the leaf springs. They are cut after rivetting to separate the longitudinal strips from the assembled transducer.

Figure 9:
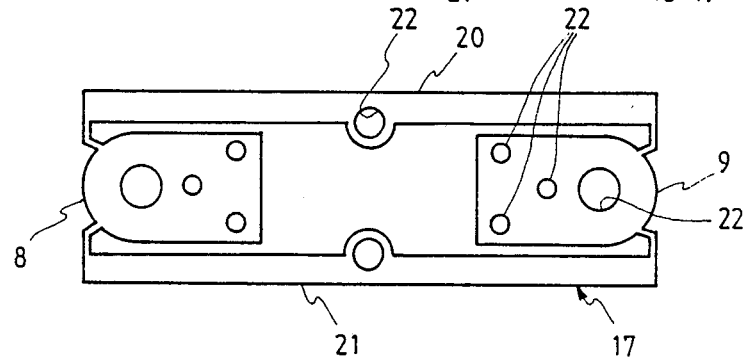
FIG. 9 is an enlarged view of FIG. 5.
Figure 10:
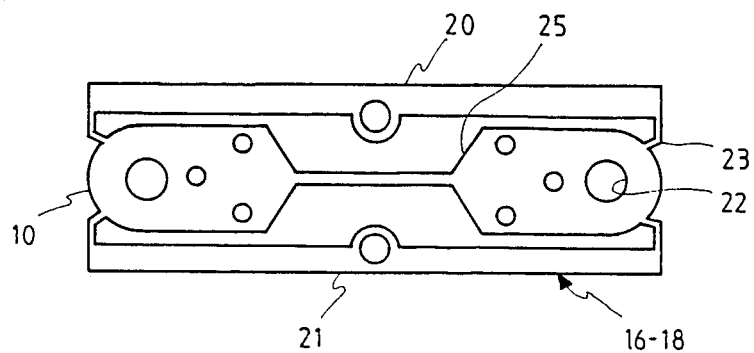
FIG. 10 is an enlarged view in more detail of FIGS. 4 and 6.

FIGS. 8 through 10 show to a larger scale the cut out components from FIGS. 3 through 7 except that in FIGS. 4 and 6 the branches 2A and 2B are joined at their ends by triangular transition areas 24 of smaller size than the triangular transition areas 25 of FIG. 10.

Figure 11:
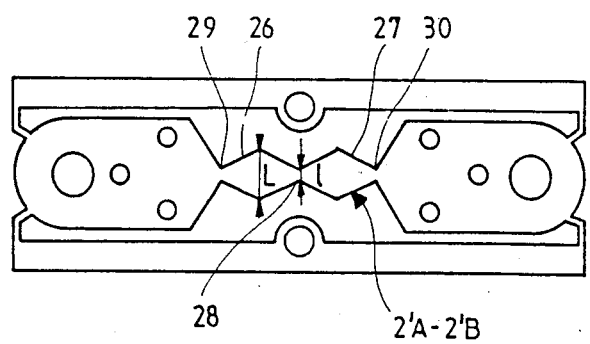
FIG. 11 is an enlarged view of a member similar to that of FIGS. 4 and 6, in a second embodiment.

FIG. 11 shows an alternative embodiment of the component 16 or 18 in which the branch 2'A or 2'B is not of constant width. This branch is formed by two symmetrical halves 26 and 27 which join through a central area 28 of minimum thickness. This makes it possible to eliminate vibration harmonics.

The halves 26 and 27 are joined to the ends 3A and 3B by connection areas 29 and 30 of the same minimum width as the central area 28.

The ratio between the maximum width L and the minimum width l of these halves is here approximately 5:1. It is preferably between 3:1 and 5:1.

The halves 26 and 27 are here of sawtooth-shape, that is to say they are bordered by flanks in segmented lines constituting identical segments.

In an alternative embodiment (not shown) the flanks of the halves are rounded.

Figure 12:
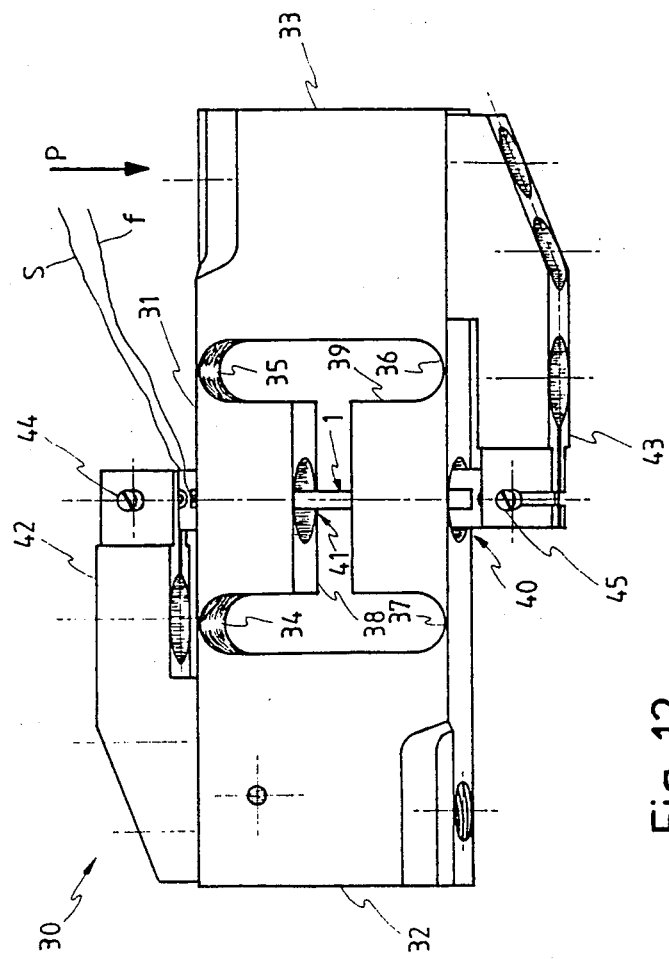
FIG. 12 is a perspective view of a load cell comprising the force transducer from FIG. 1.

FIG. 12 shows by way of example the use of the transducer from FIG. 1 in a load cell 30.

This load cell is formed by a block 31 comprising two lateral uprights 32 and 33 respectively intended to be fixed to a base and to a weighing platform (not shown). These uprights are linked by flexible areas 34 through 37 of the same thickness to two horizontal beams 38 and 39 so as to form therewith a deformable parallelogram.

The force transducer 1 is disposed vertically, inserted through the horizontal beams 38 and 39 by means of the bores 40 and 41, and joined at its ends 4 and 5 to the ends of respective upper 42 and lower 43 cantilever arms respectively fastened to the vertical uprights 32 and 33.

It is readily understood that a force P applied downwardly to the vertical upright 33 induces a traction force within the transducer as a result of deformation of the block 31.

The force transducer 1 is advantageously articulated at its ends to the cantilever arms 42 and 43 about transverse axes 44 and 45 by means of larger rivetting holes 22, as a result of which a pure force is applied to the transducer without any interfering torque due in particular to eccentricity of the position of the load on the weighing platform.

The transducer 1 is preferably made from a material with a low thermal coefficient of expansion. This is, for example, a "DURINVAL-C" alloy with the composition Ni42, Cr5, Ti2.5, Al 0.5, Si 0.5, and the remainder iron or an "NI-SPAN-C 902" alloy containing 41 to 43.5% nickel (+ cobalt), 4.9 to 5.7% chromium, 2.2 to 2.75% titanium, 0.3 to 0.8% aluminium and the remainder of iron, neglecting impurities. It may also be a copper-beryllium or a bronze-beryllium alloy for which the drift due to the thermal coefficient of expansion and the modulus of elasticity are compensated electronically.

FIGS. 13 through 18 are variants of FIGS. 1 and 3 through 7 in which the spacers 58 and 59 of the transducer 51 are extended in opposed relationship to the branches 52A and 52B by torsion arms 50A and 50B disposed in alignment with each other and terminated by fixing terminal portions 50'A and 50'B. They have the same width as said branches, for example. The length of these arms is preferably between 50% and 200% of the length of the branches.

In these figures the cut out parts 65 through 69 are also provided with longitudinal strips 70 and 71, 70' and 71', 70" and 71" which, in this case, are not identical to each other once they comprise bores 72 disposed according to the same drawings.

The torsion arms 50A and 50B make it possible to compensate for torsion between the fixing terminal areas 50'A and 50'B of the transducer and the coupling members 54 and 55 of the branches of double tuning fork.

It is these torsion areas, for example, which are articulated to the arms 42 and 43 of the load cell 30.

It goes without saying that the foregoing description has been given by way of non-limiting example only and that numerous variants may be put forward by those skilled in the art without departing from the scope of the invention. For example, in an embodiment that is not illustrated the oscillatory branches of the transducer may incorporate flyweights at their center or have a maximum width.

It will be noted that the leaf springs including the flexible branches have end, the width of which is several times the width of the branches, whereas such width of the branches is several times the thickness of such leaf springs (in a ratio preferably substantially equal to 4).

The material constituting the sheets of the laminated transducer is preferably non-magnetic (for example stainless steel or a beryllium-copper alloy).

The excitation device and the frequency sensor are preferably of the piezoelectric bimorphous type. They are completely carried by the ends of the branches while being flush with the root of same (see FIG. 1).

I claim:

1. Double tuning fork type force transducer of laminated structure comprising:

two identical metal leaf springs of constant thickness forming two identical parallel elastic branches and provided with respective ends of larger width than said branches;

two metal spacers of same thickness holding respective ends said leaf springs apart;

said spacers and said respective ends having substantially a same external profile and being fastened to each other so as to form coupling members;

said branches being adapted to vibrate in bending mode and in phase opposition in response to imposed vibrational loads with an intrinsic frequency representative of amplitude of a force applied longitudinally to said coupling members.

2. Transducer according to claim 1, wherein said ends of said leaf springs are bordered externally by metal stiffener and anchor plates which are fastened to said ends and have substantially a same external profile as said ends.

3. Transducer according to claim 1, wherein said leaf springs and said spacers have a same thickness.

4. Transducer according to claim 2, wherein said stiffener plates, said leaf springs and said spacers have a same thickness.

5. Transducer according to claim 1, wherein said leaf springs, and said spacers are formed from sheets made from a same elastic material.

6. Transducer according to claim 1, wherein said leaf springs, and said spacers are formed from riveted and/or adhesively bonded sheets.

7. Transducer according to claim 1, wherein said elastic branches are of constant width.

8. Transducer according to claim 1, wherein each of said elastic branches comprises two symmetrical halves of non-constant width which merge through a central area of minimum width and are connected to said coupling members by two areas of a same minimum width.

9. Transducer according to claim 8, wherein said halves have a maximum width which is between three and five times the minimum width.

10. Transducer according to claim 8, wherein said halves of said elastic branches have sawtooth-shaped flanks.

11. Transducer according to claim 1, wherein said spacers are integral with torsion arms extending in opposed relationship of said branches and ending in connection terminal areas.

12. Transducer according to claim 11, wherein said arms are 0.5 and 2.0 times as long as said branches.

13. Method of manufacturing a double tuning fork type force transducer comprising:

cutting two identical metal leaf springs of constant thickness, each comprising a flexible branch and ends of larger width than said branch;

cutting a pair of metal spacers of same constant thickness with a same external profile as said ends;

placing said spacers respectively between said ends and fastened to said ends so that said flexible branches of said leaf springs are parallel and said spacers together with said ends form coupling members to said branches;

wherein said force transducer is laminated.

14. Method according to claim 13, further comprising cutting out pairs of metal plates having substantially the same external profile as the spacers and securing said pairs of metal plates to said spacers and to said ends of said leaf springs.

15. Method according to claim 14, comprising cutting out each of said leaf springs, said pair of spacers and said pairs of metal in metal sheets in such a way that each of said leaf springs, said pair of spacers and said pairs of metal plates is joined by fragile links to longitudinal positioning strips which are all identical, superposing said longitudinal strips and, after fastening said leaf spring ends, said spacers and said plates together, cutting said fragile links.

16. A load cell comprising a block incorporating first and second vertical uprights respectively intended to be fixed to a base and to a weighing platform, joined by four flexible areas with two horizontal beams, two vertically aligned vertical bores being provided through median portions of said beams, and two respectively upper and lower arms mounted cantilever fashion on said first and second vertical uprights, a double tuning fork type force transducer being inserted vertically through the bores in the horizontal beams and joined to said ends of said cantilever arms, said force transducer being of laminated structure and comprising two identical metal leaf springs of constant thickness forming two identical parallel elastic branches and provided with respective ends of larger width than said branches, two metal spacers of same thickness holding respective ends said leaf springs apart, said spacers and said respective ends having substantially a same external profile and being fastened to each other so as to form coupling members, said branches being adapted to vibrate in bending mode and in phase opposition in response to imposed vibrational loads with an intrinsic frequency representative of amplitude of a force applied longitudinally to said coupling members.

17. A load cell according to claim 16, wherein said force transducer is articulated to said ends of said cantilever arms about axes perpendicular to said vertical uprights and to said horizontal beams.

18. A load cell according to claim 16, wherein said force transducer comprises torsion arms extending in opposed relationship to said branches and ending in terminal areas for connection to said ends of said cantilever arms.

19. Method according to claim 13, comprising cutting out each of said leaf springs and said pair of metal spacers in metal sheets in such a way that each of said leaf springs and said pair of spacers is joined by fragile links to longitudinal positioning strips which are all identical, superimposing said longitudinal strips and, after fastening said leaf spring ends and said spacers together, cutting said fragile links.

* * * * *